United States Patent [19]

Bloink

[11] 4,033,018

[45] July 5, 1977

[54] INDEXABLE MILLING CUTTER

[75] Inventor: Harry William Bloink, Redford, Mich.

[73] Assignee: Illinois Tool Works Inc., Chicago, Ill.

[22] Filed: July 16, 1976

[21] Appl. No.: 705,975

[52] U.S. Cl. .................................... 29/105 A
[51] Int. Cl.² .................................... B26D 1/12
[58] Field of Search .............. 29/105, 105 A, 96

[56] References Cited

UNITED STATES PATENTS

| | | | |
|---|---|---|---|
| 3,205,559 | 9/1965 | Greenleaf | 29/105 A |
| 3,217,384 | 11/1965 | Wirfelt | 29/105 A |
| 3,315,332 | 4/1967 | Lowry et al. | 29/105 A |
| 3,391,438 | 7/1968 | Milewski | 29/105 A |

*Primary Examiner*—Harrison L. Hinson
*Attorney, Agent, or Firm*—Thomas W. Buckman; Robert W. Beart

[57] ABSTRACT

A milling cutter having an annular body with a plurality of seating slots formed in the outer peripheral surface extending generally longitudinally of the body and circumferentially spaced thereabout. An indexable insert cutter member is positioned in each slot and retained therein by a wedge member. An axial backing plate member is positioned and secured behind each cutter member in the slots. The bottom edge of the backing member is configured so as to permit the backing member to rock against the bottom surface of the slot to insure accurate line contact between the front edge of the backer plate and the rear edge of the insert cutter member.

5 Claims, 5 Drawing Figures

INDEXABLE MILLING CUTTER

BACKGROUND OF THE INVENTION

This invention relates generally to the field of cutting tools, such as milling cutters having replaceable, indexable cutting inserts. More particularly, the invention relates to a structure for mounting and accurately seating such inserts in the body of a cutter.

Tools of this type are available in a variety of configurations. For example, one such prior art device includes an indexable cutter blade placed in a slot and retained therein merely through the use of a wedge member. Another typical prior art device utilizes a nest or anvil secured by a threaded fastener within a slot with a cutting insert wedged in the slot so that at least two surfaces or edges of the insert are forced into engagement with accurately finished mating edges or surfaces on the nest or anvil. A still different prior art device utilizes a cam pin mounted on a fixed axis generally perpendicular to the bottom of the slot and which provides axial adjustment and support to an insert mounted in front of the cam in the slot.

Prior art devices in one way or another sacrifice accuracy of mounting, adjustability and/or ease of replacement and/or adjustment.

SUMMARY OF THE INVENTION

It has been found that the use of a single axial backer plate locked in a slot so that its leading edge abuts and provides line contact with the trailing edge of the cutting insert will produce the accuracy and durability required in such applications. Supporting abutment of this type prevents the possibilities that high cutting forces on the insert, reacting against a point contact support, will cause rotation, movement or dislodgement of the insert. The cutter of the present invention utilizes this concept and insures that accurate line contact is provided between the backer plate and the cutter insert through the use of a bottom edge on the backer plate configured to rock against the bottom of the slot permitting accurate adjustment of the inclination of the leading edge of the backer plate relative to the bottom wall. In addition to this novel feature, the leading edge of the backer plate is advantageously rounded in cross section to insure that line contact is provided once the leading edge has been properly aligned.

The structure of the present invention thus provides an accurate and rigid cutter in the most economical manner since it does not utilize, or rely upon, accurately machine anvils, nests or slot surfaces. The structure of the present invention has the further advantage that it permits precision axial adjustment of the cutting insert where necessary.

DESCRIPTION OF THE PREFERRED EMBODIMENTS

Figure 1:
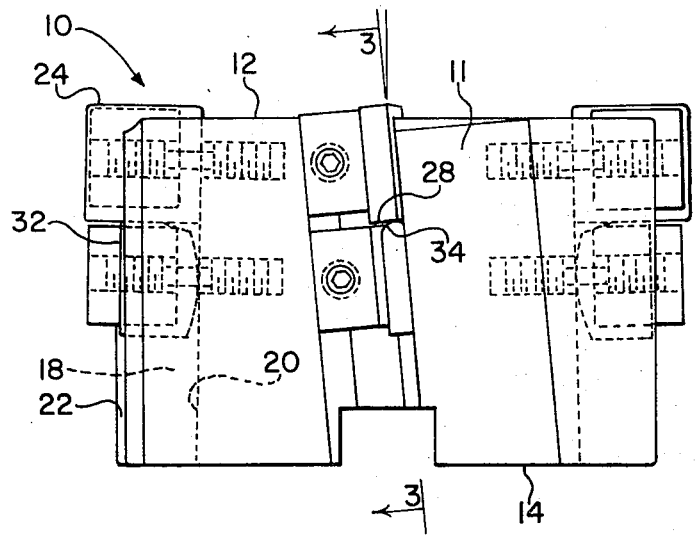
FIG. 1 is a side elevational view of a cutter body incorporating the invention.
Figure 2:
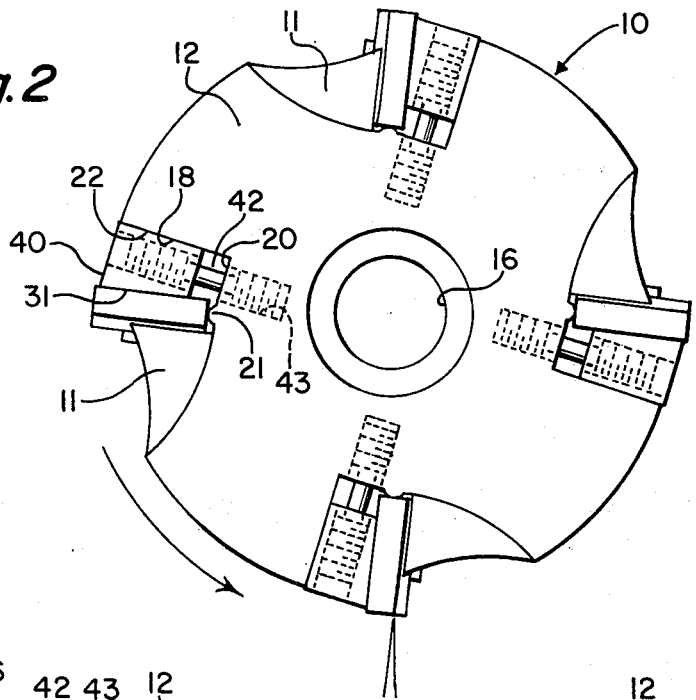
FIG. 2 is a front end elevational view of the cutter body shown in FIG. 1.

The milling cutter 10 shown in FIGS. 1 and 2 includes an annular body having end faces 12 and 14 and an axial bore 16 extending therethrough for mounting on a spindle or the like. The outer peripheral surface of the body will include a plurality of slots 18 extending substantially longitudinally of the body. The slots will preferably intersect the front end face 12 so that a carbide cutting insert 24 may be mounted therein with edges protruding longitudinally beyond the end face 12 and radially beyond the periphery of the body. Pockets 11 formed in the body adjacent the cutting inserts facilitate the removal of chips from the workpiece.

The slots 18 broadly define a bottommost seating wall 20 and a pair of opposing side walls 22. It should be noted that the inclination of the walls defining the slot relative to the central axis and radius of the body may be varied to provide the desired axial and radial rake angles. For example, the embodiments shown herein include a negative axial rake angle as well as a negative radial rake angle.

An indexable cutting element, such as polygonal element 24, is positioned in the slot adjacent one end face 12 of the cutter so as to define a leading edge 26, a trailing edge 28, a bottommost edge 30 and generally opposing, substantially planar side surface faces 31. The cutting insert is secured within the slot through the use of a wedge member 40 which tightly engages one side face 31 of the insert and one side wall 22 of the slot to force the insert into tight locking engagement with the opposing side wall of the slot. The wedges 40 are fixedly secured to the body through the use of threaded fastener 42 and mating threaded bore 43 formed in the body.

The wafer-like backing member 32 is configured so as to include a leading edge 34, a trailing edge 36, a bottom edge 38, and a pair of generally opposing flat side face surfaces 39. In use, the backer plate 32 is positioned longitudinally behind the insert 24 so that the leading edge 34 of the backer plate abuts the trailing edge 28 of the insert. The novel design of the backer plate permits accurate adjustment to insure that line contact exists between the trailing edge of the insert and the leading edge of the backer plate. To insure such line contact, the leading edge 34 is preferably arcuate in cross section.

A longitudinally extending portion 21 of the bottom wall 20 associated with the bottom edges of the backer plates and cutting inserts may be crowned to establish line contact between the bottom edges of the backer plate and cutting insert and the bottom wall of the slot.

Due to the dimensional tolerances on mating surfaces between various elements in a cutter body of this type, the inclination of the leading edge of the backer plate should be capable of being varied to accurately mate with the trailing edge of the insert. For this purpose, the bottom edge 38 of the backer plate is configured to permit rocking of the backer member in the plane of the insert. This is accomplished by providing a narrow, nonlinear surface of the bottommost edge of the backer plate extending from the leading edge to the trailing edge with a point intermediate these leading and trailing edges which is lower than any other point on the bottom edge. A preferred embodiment of the invention shows bottom edge 38 to be substantially flat in cross section but convex as it extends from the leading to trailing edges. Such a convex configuration will provide a single fulcrum point about which the backer plate may rotate so as to accurately align the leading edge of the backer member with the trailing edge of the insert.

The backer plate member is also secured to the body through the use of a wedge member 44. A threaded fastener 46 extending through the wedge and into a mating threaded bore 47 in the body draws the wedge into locking engagement with one side surface 39 and an associated side wall surface 22 of the slot.

Figure 3:
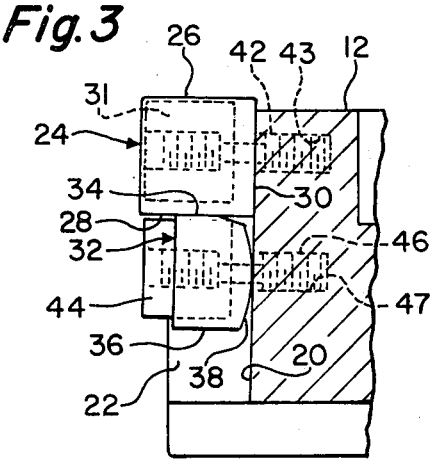
FIG. 3 is a partial section view taken along lines 3—3 of FIG. 1 and showing the backer plate and cutting insert of the present invention.
Figure 5:
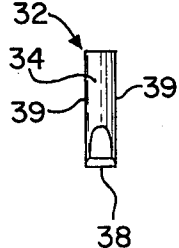
FIG. 5 is a front end view of the backer plate of the invention.

With the configuration of the mounting elements shown in FIGS. 1-3, the backer may be positioned and accurately seated against the insert but does not require further manipulation or change in the backer once it has been aligned. Thereafter, the inserts may be indexed or changed without moving the backer plate. However, the configuration described in FIGS. 1-3 does not provide a precision axial adjustment for the cutting element, when necessary.

Figure 4:
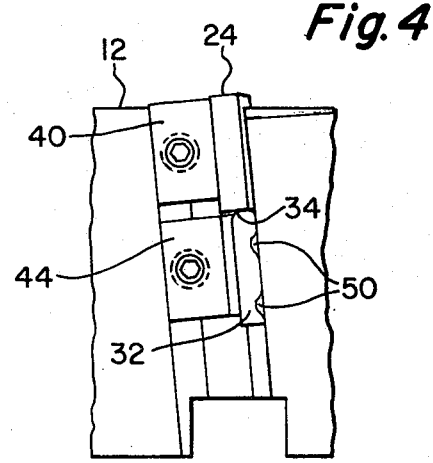
FIG. 4 is a partial side elevational view of an alternate embodiment of the invention.

In FIG. 4 the invention is substantially identical to that described in FIGS. 1-3 with the exception that once the backer plate is accurately set and adjusted so that proper line contact for a particular insert is obtained it may be secured through weldments 50, typically provided by a tack welding procedure. This allows repetitive production operations while preventing operator tampering with a presetting and yet permits proper indexing or insert changing without interference with the original preset accuracy.

The invention just described can be incorporated in any variety of inserted and indexable blade milling cutters. While the embodiments shown herein include four radially spaced cutting inserts, it should be apparent that the structure of the mounting is adaptable for coarse pitch cutters, medium pitch cutters and is also advantageously adaptable for fine pitch cutters. Since the backer plate is as thin, if not thinner than the cutting insert, a large number of inserts per peripheral inch can be provided and still insure the rigidity required in such fine finish applications.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A cutting tool comprising an annular body with a central axis, a pair of end faces and an outer peripheral surface, a plurality of slots formed in the outer peripheral surface intersecting at least one end face of the body, each slot defining a generally longitudinally extending bottom wall surface and a pair of generally opposing side wall surfaces, an indexable cutting insert positioned in each slot and configured to define side surface faces, leading, trailing and bottom edges with the leading edge adjacent said at least one end face of the body, a wedge member positioned in the slot so as to bear against one side surface face of the cutting insert and one side wall surface of the slot securing the cutting insert therein, a backer plate positioned in the slots longitudinally behind each cutting insert, the backer plate also defining side surface faces, leading, trailing and bottom edges, the bottom edge of the backer plate being a narrow, non-linear surface extending from the leading edge to the trailing edge thereof, said non-linear surface including a point intermediate said leading and trailing edges which is lower than any other point on said bottom edge surface thereby permitting the backer plate to rock against the bottom wall into a position which provides accurate line contact between the leading edge of the backer plate and the trailing edge of the cutting insert, a wedge member positioned in the slot so as to bear against one side surface face of the cutting insert and one side wall surface of the slot.

2. The cutting tool of claim 1, wherein the bottom edge of the backer plate is generally convex from the leading edge to the trailing edge thereof.

3. The cutting tool of claim 1, wherein the leading edge surface of the backer plate is convex in cross section to provide line contact between the backer plate and the trailing edge of the cutting insert.

4. The cutting tool of claim 1, wherein the cutting insert is polygonal with a plurality of generally linear edge surfaces.

5. The cutting tool of claim 1, wherein the backer plate is welded to the slot.